Figure 1:
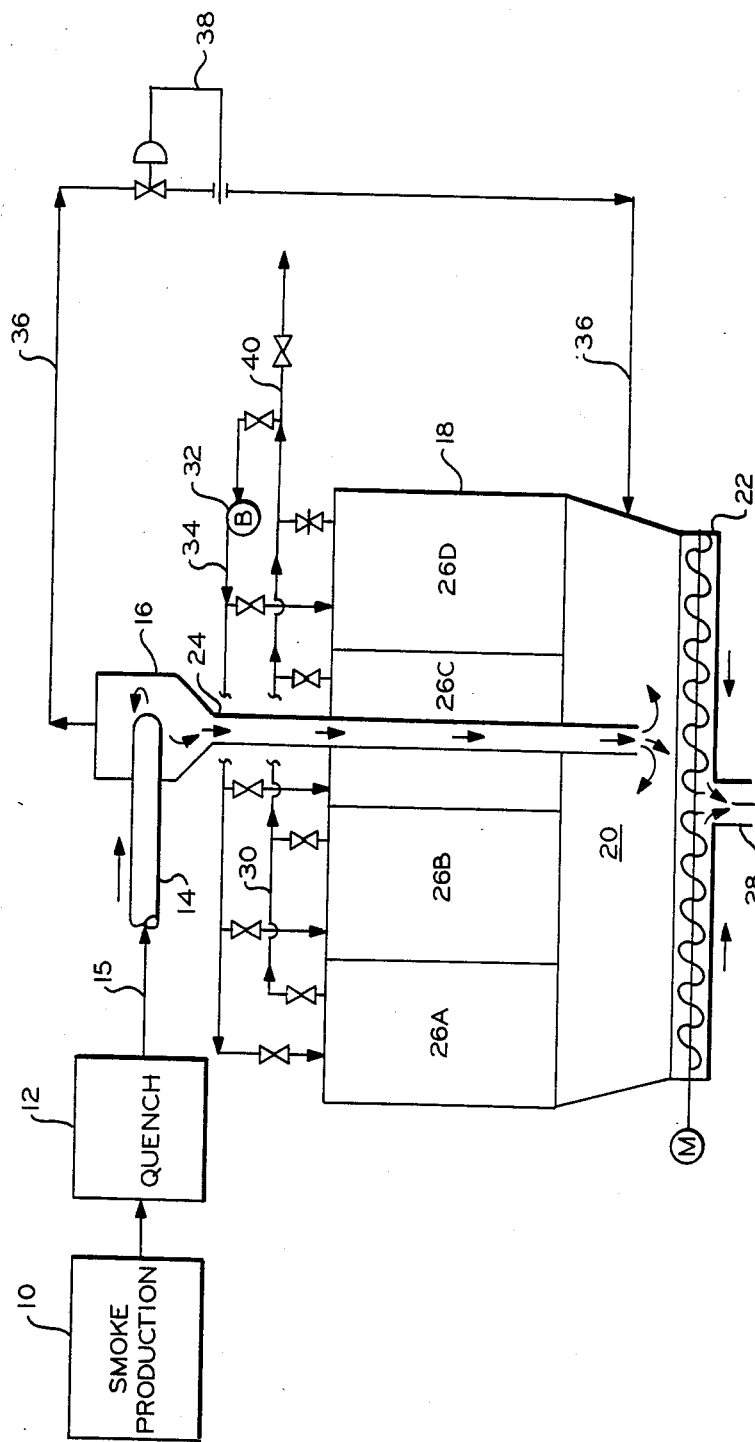

United States Patent [19]

Johnson

[11] Patent Number: 4,579,567
[45] Date of Patent: Apr. 1, 1986

[54] AGGLOMERATING CARBON BLACK USING CYCLONE AT ENTRANCE TO BAG FILTER

[75] Inventor: Paul H. Johnson, Bartlesville, Okla.

[73] Assignee: Phillips Petroleum Company, Bartlesville, Okla.

[21] Appl. No.: 651,736

[22] Filed: Sep. 18, 1984

[51] Int. Cl.⁴ .............................................. B01D 29/14
[52] U.S. Cl. ................................ 55/97; 55/341 MC; 55/341 PC; 55/DIG. 25; 23/314
[58] Field of Search ........ 55/96, 97, 341 R, 341 MC, 55/341 PC, 85, 302, DIG. 25; 23/314

[56] References Cited

U.S. PATENT DOCUMENTS

| | | | |
|---|---|---|---|
| 2,690,813 | 10/1954 | Diebold | 183/67 |
| 2,785,769 | 3/1957 | Pollock | 183/114 |
| 2,785,964 | 3/1957 | Pollock | 23/314 |
| 2,836,256 | 5/1958 | Caskey | 183/34 |
| 2,917,374 | 12/1959 | Wood | 23/314 |
| 2,949,349 | 8/1960 | King | 23/314 |
| 3,102,005 | 8/1963 | Dye | 23/314 |
| 3,541,764 | 11/1970 | Astrom | 55/302 |
| 4,396,590 | 8/1983 | Cheng | 55/DIG. 25 X |

FOREIGN PATENT DOCUMENTS 0687772  6/1964  Canada .............................. 55/97

Primary Examiner—Charles Hart
Attorney, Agent, or Firm—A. W. Umphlett

[57] ABSTRACT

A cyclonic agglomerator is used in the inlet line for quenched carbon black smoke into a bag house to increase the efficiency of carbon black processing.

8 Claims, 1 Drawing Figure

AGGLOMERATING CARBON BLACK USING CYCLONE AT ENTRANCE TO BAG FILTER

BACKGROUND OF THE INVENTION

This invention relates to carbon black manufacture. In one of its aspects this invention relates to the recovery of carbon black. In another of its aspects this invention relates to the use of bag filters in the recovery of carbon black. In a more specific aspect this invention relates to the agglomeration of carbon black particles before entry into a bag filter apparatus.

In the recovery of quenched smoke in the production of carbon black, it has long been a standard operation to pass the smoke through bag filtering units so that the carrying gas is passed through the bags while the carbon particles collect on the surface of the bags. It is common to operate these bag filters in groups in what is termed a bag house so that flow can be maintained through a portion of the bags while another portion of the bags is being treated by backflow and/or shaking to remove the collected carbon black from the surface of the bags for collection on the floor of the bag house and conveyance therefrom to further processing.

Improvements in the efficiency of the operation of the collection are always of interest. In the present invention the installation of a cyclone unit to act as an agglomerator as the total flow of quench smoke is passed into the bag house provides an increase in the efficiency of operation.

It is therefore an object of this invention to improve the efficiency of operation of a bag house collection system for carbon black smoke. It is another object of this invention to provide an apparatus that improves the efficiency of collecting carbon black smoke.

Other aspects, objects and the various advantages of this invention will become apparent upon a study of the specification in conjunction with the drawing and the appended claims.

STATEMENT OF THE INVENTION

In accordance with this invention an apparatus is provided for the recovery of carbon black. In the apparatus the conduit for quenched carbon black reactor smoke is connected as inlet into at least one cyclonic agglomerator mounted to discharge into the surge section above the conveyor section of a carbon black bag house with the agglomerator having vertical discharge of the total inlet flow into the surge tank section to outlet means at the base of the agglomerator.

The invention is best understood in conjunction with the drawing which combines a cutaway depiction of the agglomerator and bag house with a line representation of the process.

Referring now to FIG. 1 of the drawing which illustrates the invention schematically. In a total process, carbon black smoke is produced in a carbon black furnace 10 with the smoke passing through a quench operation 12 in which the smoke is contacted with sufficient quench medium to stop the reaction. The processes for producing and quenching carbon black are numerous and well-known. For the purposes of this invention, any process for the production and quenching of carbon black smoke can serve to provide quenched carbon black smoke for the process of the present invention.

Quenched carbon black smoke is passed through conduit 14 into a cyclonic agglomerator 16 which is mounted to discharge the total inlet flow comprising carbon black particles and carrier gas into the bag house 18 in the surge section 20 at a point above the conveyor section 22. The agglomerator is most practically mounted at a point above the bag house so the discharge is through an outlet conduit 24, but could be mounted within the bag house as long as there is sufficient clearance between the outlet of the agglomerator and the conveyor section to allow free flow of the carrier gas into the bags of sections 26A, 26B, 26C and 26D.

In actual operation, the quenched carbon black smoke passed through inlet conduit 14 into the cyclonic agglomerator 16 where the cyclone action assists in the contact of the carbon black particles to agglomerate the particles, i.e. to cause the particles to adhere to one another to produce a particle of greater size and mass. The agglomerated particles then pass from the agglomerator by gravity through the outlet line 24 into the surge tank section 20 of the bag house 18. The agglomerated carbon black falls directly to the bottom of the bag house onto the conveyor 22 which is operated to move the particles for discharge through exit 28 in the flow of the bag house.

The carrier gas still containing particles of carbon black that are small enough to be carried by the gas moves up through the operating section 26A, 26B, 26C and 26D containing filter bags (not shown) and out of manifold 30 for discharge through line 40 from the system. The carbon black particles do not pass through the bags. When any section of bags, for example 26A, becomes sufficiently coated with particles the passage of gas is inefficient. By manipulating the valves in manifolds 30 and 34, the flow from this section can be stopped and a portion of the exit gas from manifold 30 can be routed through blower 32 and maifold 34 to be used for momentarily back blowing the bags in section 26A and then reversing the procedure to return the section 26A to service.

In an embodiment of the invention, conduit means 36 carries an overhead stream low in carbon black between the top of the agglomerator 16 and the surge section 20 of the bag house 18. Conduit 36 can carry up to 50% of the total stream 15 to agglomerator 16 and can be controlled by flow control means 38 in conduit 36. Use of this overhead line will affect the efficiency of the agglomerator. By allowing a portion of the discharge stream from the agglomerator to be carried in the conduit 36 the velocity of the discharge stream in outlet line 24 is reduced to aid the dropout of the agglomerated particles.

As an example of the operations set out above in which 100% of the smoke charged to the agglomerator is passed through the agglomerator into the bag house, calculations were made using a flow of 1342 mscf/hr of smoke into and out of the agglomerator, an inlet and outlet temperature of 500° F. for this smoke, an inlet pressure of 15.5 to 16.0 psia, and outlet pressure of 15.3 to 15.8 psia, a loading of 5.4 pounds of carbon black/1000 scf of flow, and a particle size (N330) of 25 (nanometers) nm average. Of these flow rates it was calculated that the conduit for quenched carbon black connected as inlet into the agglomerator, conduit 14, should be in the range of about 24 to about 30 inches diameter. The agglomerator 16 should be about 5 feet in diameter and about 10 feet high and the outlet 24 of the agglomerator 16 should be about 24 to about 30 inches in diameter. It was also calculated that without use of the agglomerator the bag house would need to contain about 15% more bags than when using the agglomeration method or, stated differently, the system using the agglomerator can filter about 17.7% more carbon black than a system using the same size bag house without the agglomeration.

It can be readily seen that the calculations show a decided increase in efficiency of the combination of using an agglomerator with the bag house as compared to a bag house without the agglomerator. It should be noted that the use of an overflow line from the agglomerator would affect the advantage shown by the calculations above in proportion to the amount of gas that exits the top of the agglomerator.

I claim:

1. An apparatus for recovery of carbon black comprising:
    (a) a conduit for quenched carbon black reactor smoke connected as inlet to
    (b) at least one cyclonic agglomerator mounted to discharge into the surge section above the conveyor section of a carbon black bag house and having vertical discharge of the inlet flow into said surge tank section through outlet means at the base of the agglomerator, and
    (c) a conduit means with flow control means in open communication to conduct flow from the top of said agglomerator through the control means directly into the surge tank section of said bag house.

2. An apparatus of claim 1 wherein said at least one agglomerator is mounted to discharge from the base of said agglomerator directly into said surge tank section.

3. An apparatus of claim 1 wherein said at least one agglomerator is mounted to discharge from the base of said agglomerator through an outlet conduit into the surge tank section.

4. An apparatus of claim 1 wherein there is a multiplicity of agglomerators with at lease one agglomerator mounted to discharge from the base of said allomerator directly into said surge tank section and at least one agglomerator mounted to discharge from the base of said allomerator through an outlet conduit into said surge tank section.

5. A method for recovering carbon black smoke comprising discharging carbon black smoke into a conduit connected to at least one cyclonic agglomerator mounted to discharge into the surge section above the conveyor section of a carbon black bag house and having vertical discharge of the inlet flow into said surge tank section through outlet means at the base of said agglomerator and a conduit means with flow control means in open communication to conduct flow from the top of the agglomerator through the control means directly into the surge tank section of said bag house.

6. A method of claim 5 wherein said at least one agglomerator is mounted to discharge from the base of said agglomerator directly into said surge tank section.

7. A method of claim 5 wherein said at least one agglomerator is mounted to discharge from the base of said agglomerator through an outlet conduit into said surge tank section.

8. A method of claim 5 wherein there is a multiplicity of agglomerators with at least one agglomerator mounted to discharge from the base of said agglomerator directly into said surge tank section and at least one agglomerator mounted to discharge from the base of said agglomerator through an outlet conduit into surge tank section.

* * * * *